Oct. 4, 1960 V. P. DONNER ET AL 2,954,756
TRACTOR STEERING SYSTEM
Filed Feb. 21, 1958 3 Sheets-Sheet 1

INVENTORS.
Verne P. Donner
William W. Henning
George S. Allin, Jr.
Paul O. Pippel
Atty.

Oct. 4, 1960  V. P. DONNER ET AL  2,954,756
TRACTOR STEERING SYSTEM
Filed Feb. 21, 1958  3 Sheets-Sheet 2
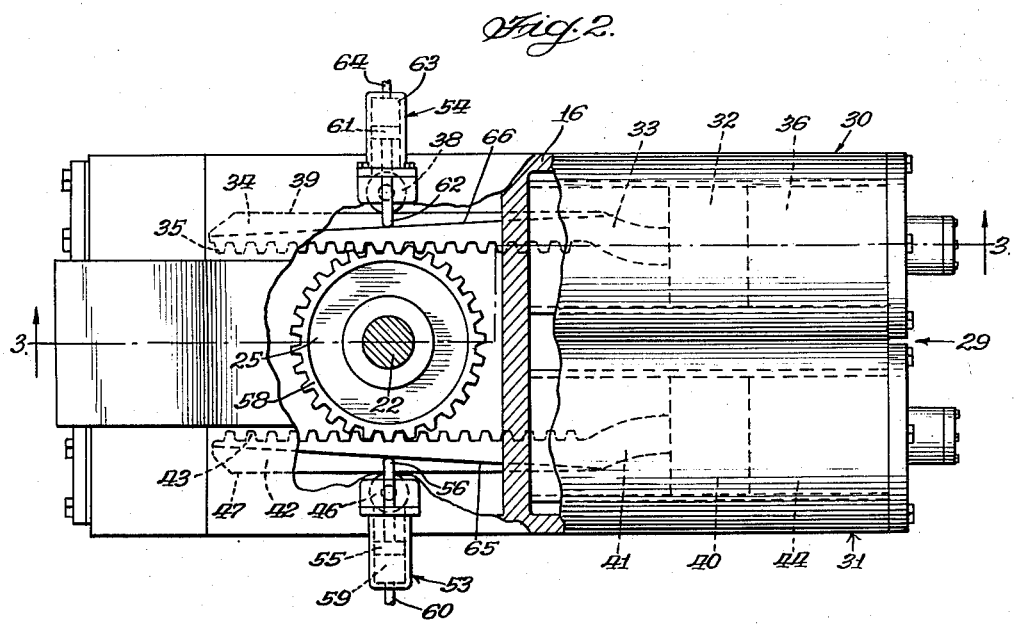
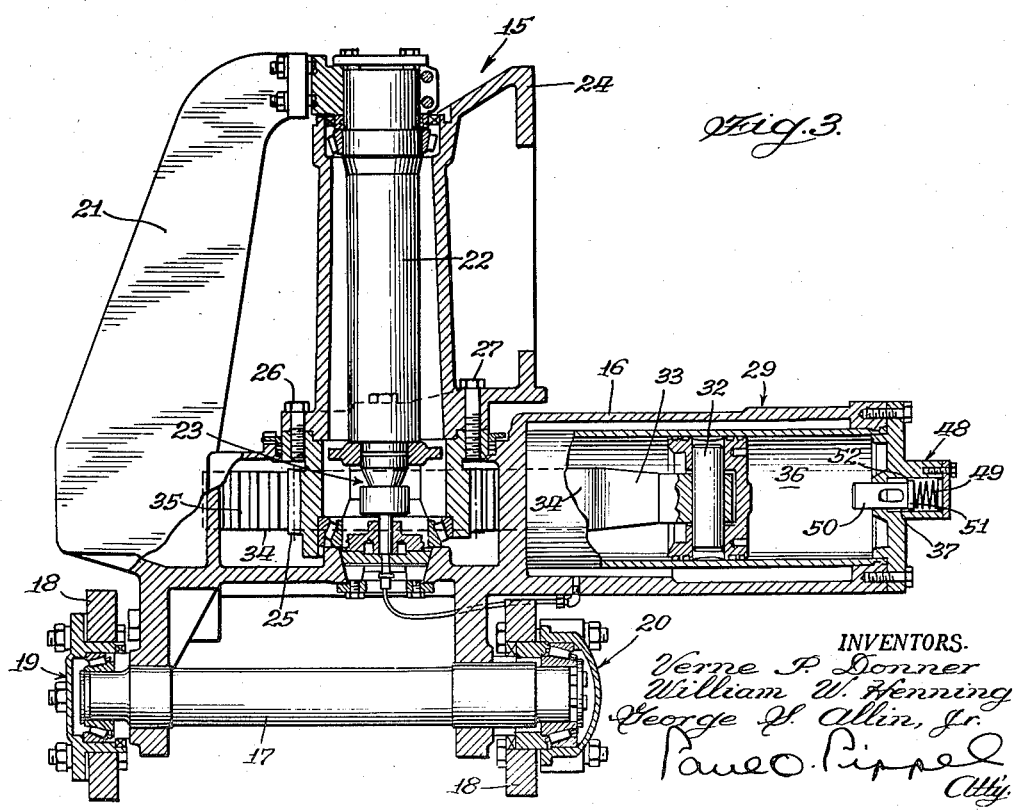
INVENTORS.
Verne P. Donner
William W. Henning
George S. Allin, Jr.
Paul O. Pippel
Atty.

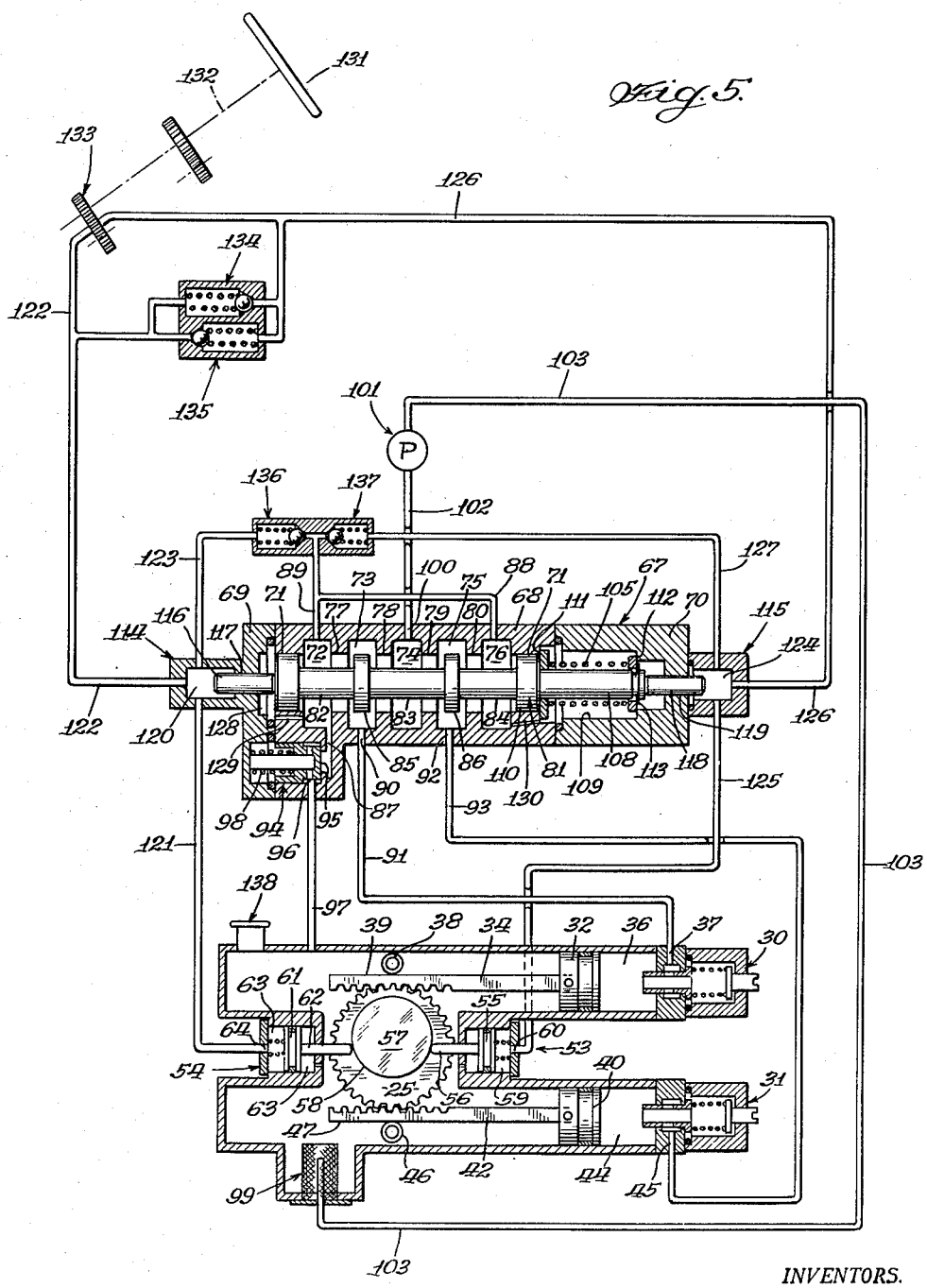

United States Patent Office 2,954,756
Patented Oct. 4, 1960

2,954,756

TRACTOR STEERING SYSTEM

Verne P. Donner, Palatine, William W. Henning, Hinsdale, and George S. Allin, Jr., Homewood, Ill., assignors to International Harvester Company, Chicago, Ill., a corporation of New Jersey Filed Feb. 21, 1958, Ser. No. 716,642

7 Claims. (Cl. 121—41)

This invention relates to an hydraulic steering mechanism. More in particular this invention relates to an hydraulic power steering system for a two-wheel tractor pivotally connected to a trailer such as a road scraper.

Hydraulic power steering mechanisms are generally provided with an independent source of fluid under pressure such as, for example, a small pump driven by the vehicle power plant. However, particularly at low engine speeds, rapid angular displacement of the tractor with respect to its associated trailer is impossible because of the low rate of delivery of fluid under pressure from the small pump.

In general tractors of the two-wheel type are provided with a relatively large capacity pump to serve utility purposes such as hydraulic cylinders or motors for controlling the ground engaging elements or dumping a loaded trailer. An important object of this invention is the elimination of the small capacity steering pump by adapting the large capacity utility pump for power steering purposes.

Another important object of this invention is to provide a fluid power steering system having follow-up progressive steering characteristics whereby the angular displacement of the tractor with its trailer assumes a position corresponding to the position of the steering control wheel.

A further object of this invention is to provide a simplified valve mechanism which diverts a flow of fluid under low pressure to the steering motor in such manner that backlash of the steering components is avoided at all times.

A still further object of this invention is to provide an hydraulic power steering system whereby irregularities in road conditions are communicated to the steering control wheel such that the operator may have the benefit of "road feel."

These and other important objects inherent and encompassed by the invention will be more readily understood from the ensuing description, the appended claims, and the annexed drawings wherein:

Figure 3 is a side elevation, partly in section and partly broken away, taken on line 3—3 of Figure 2 illustrating in a detailed construction of a pivotal hitching mechanism of the tractor to the trailer including the power unit for effecting angular displacement of the tractor with respect to the trailer according to this invention;

Figure 4 is a side elevaion in section taken on the longitudinal axis of the simplified fluid control valve according to this invention;

Figure 2:
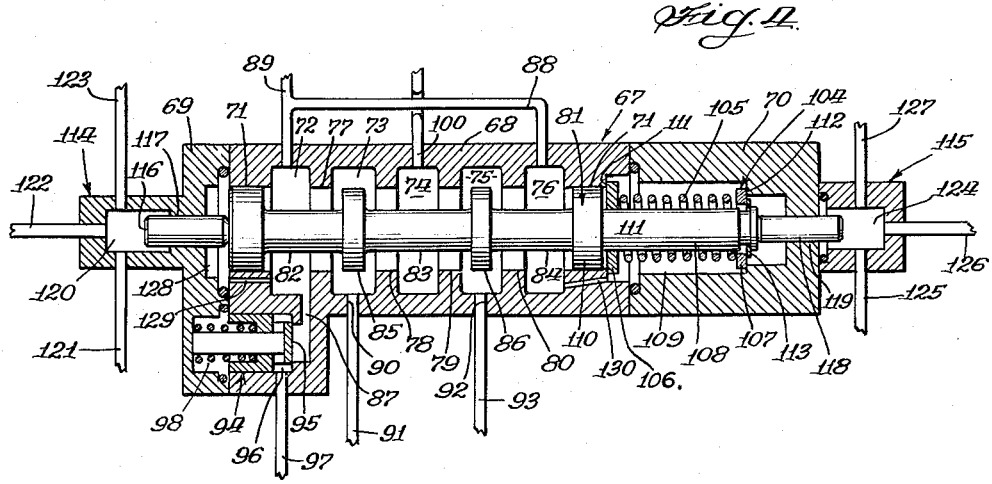
Figure 2 is a plan view, partly broken away, taken on line 2—2 of Figure 1 showing the general arrangement of an hydraulic motor and associated angular displacing components for steering a two-wheeled tractor and trailer according to this invention.
Figure 6:
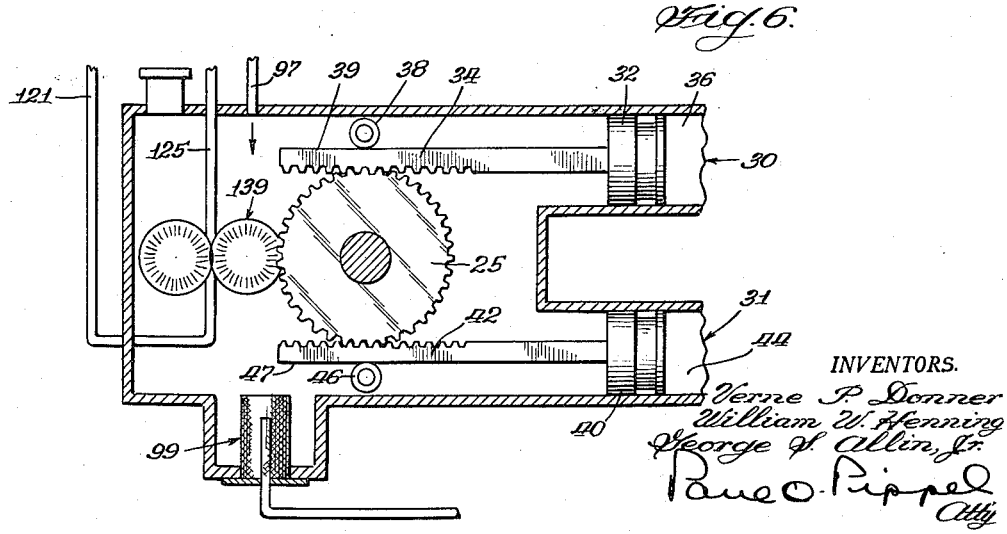

Figure 5 is a schematic drawing showing each of the various components and the interrelated fluid connections therefor to form the hydraulic working circuit and the hydraulic control circuit comprising a preferred embodiment of this invention; and Figure 6 is a plan elevation similar to Figure 2 except that it is in schematic form illustrating an alternate construction employing a gear type servo-pump instead of a piston type pump.

Figure 1:
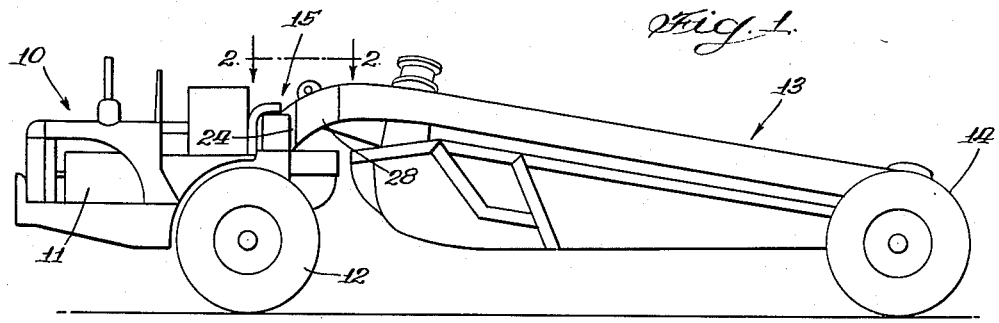
Figure 1 is a side elevation of a two-wheeled tractor pivotally connected to a trailer illustrating an environment in which this invention may be utilized.

With continued reference to the drawings illustrating a preferred embodiment of the invention, it will be seen from Figure 1 that the numeral 10 generally indicates a two-wheeled tractor having a power plant or engine 11 supported by a pair of ground engaging traction wheels, one of which is shown at 12. The numeral 13 generally indicates a trailer such as, for example, a road scraper supported on the rearward portion by a pair of ground engaging wheels, one of which is shown at 14. The forward portion of the trailer 13 is pivotally connected to the rearward portion of the tractor 10 in a well known manner as generally indicated at 15.

Referring to Figures 2 and 3 it will be seen that the portion of the pivotal connection 15 mounted on the rearward section of the tractor 10 may comprise a housing or casing 16 pivotally mounted on a longitudinal shaft 17. The shaft 17 is journalled to the tractor frame 18 on the two axially disposed bearing assemblies generally indicated at 19 and 20. From this it will be seen that the casing 16 may rotate to a limited degree longitudinally with respect to the tractor 10 for purposes explained later.

The casing 16 also includes an upwardy extending yoke 21 (Figure 3) which supports the upper end portion of a king pin 22. The lower portion of the king pin 22 is supported by the casing 16 as generally indicated at 23 in Figure 3.

A carrier member 24 is pivotally mounted on the king pin 22 and is connected to a large pinion gear 25 by a plurality of bolts, two of which are shown at 26 and 27. A connecting element 28 commonly referred to as a "gooseneck" of the forward portion of the trailer 13 is rigidly connected to the carrier member 24 by any conventional means such as bolts. Thus the trailer may pivot about the king pin 22 in substantially a vertical plane and forms a hitch between the trailer 13 and tractor 10. The shaft 17 permits rotational movement of the casing 16 and trailer 13 longitudinally with respect to the tractor 10 so that deviations in road conditions do not impose an unnecessary lateral strain on the king pin 22 and its supporting elements.

The rearward portion of the casing 16 is provided with a fluid powered reversible motor generally indicated at 29. The motor 29 may conveniently be comprised of a first single-acting ram 30 and a second single-acting ram 31 disposed in opposed parallel relation with respect to each other. The ram 30 is provided with a piston 32 and connecting rod 33. The rod 33 may be integrally or pivotally connected to a first rack member 34 having inwardly extending gear teeth 35 in engaging relation with the pinion gear 25 as best shown in Figure 2. Thus it may be seen that fluid under pressure entering the chamber 36 through the port 37 urges the piston 32 forwardly for moving the pinion gear 25 in a counter-clockwise direction as viewed in Figure 2. It should be observed that a roller 38 is mounted on the casing 16 for vertical rotation and in engaging relation with the outer edge 39 of the rack member 34 so that the member 34 is maintained in meshed relation with the pinion gear 25 as best shown in Figure 2.

In a similar manner to that described above, the ram 31 is provided with a piston 40 and connecting rod 41. The rod 41 may be integrally or pivotally connected to a second rack member 42 having inwardly extending gear teeth 43 in engaging relation with the pinion gear 25 as best shown in Figure 2. From this it may be seen that fluid under pressure entering the chamber 44 through the port 45 urges the piston 40 forwardly for moving the pinion gear 25 in a clockwise direction as viewed in Figure 2. It will be again noted that a roller 46 is mounted on the casing 16 for vertical rotation and in engaging relation with the outer edge 47 of the rack member 42 so that the member 42 is maintained in meshed relation with the pinion gear 25 as best shown in Figures 2, 5 and 6.

It may now be appreciated that when one of the rams 30 and 31 expands, the other correspondingly retracts. In order to prevent damage to a retracting ram due to the engagement of the rearward face of its piston with the rearward end portion of the cylinder the ports 37 and 45 each are provided with a snubbing valve, one of which is indicated at 48 in Figure 3. The snubbing valves serve to terminate the exhausting of fluid through the ports 37 and 45 when either of the two pistons 32 or 40 are retracted to a predetermined limit. Although not a part of the present invention, the snubbing valve 48 may conveniently be comprised of a captive spring 49 positioned to urge forwardly a valve stem 50 to its limit formed by an enlarged portion 51 abutting a corresponding shoulder 52 formed in the casing 16. Retractive movement of the piston 32 causes the pressure side thereof to engage the valve stem 50 for further compression of the spring 49. Movement of the valve stem 50 rearwardly progressively closes or throttles the port 37 so that rearward movement of the piston 32 is dampened initially and ultimately almost stopped by confined fluid in the chamber 36 before abutting the rear end wall of the casing. However, it should be understood that fluid communication between the port 37 and the chamber 36 is never completely closed by movement of the stem 50 as otherwise difficulty may be encountered in attempting to energize the ram 30 subsequently. The snubbing valve disposed in the ram 31 associated with the port 45 is similar in construction to the snubbing valve 48 above described.

For purposes described later the power steering mechanism of this invention is provided with a servo-pump. The servo-pump may conveniently be comprised of a left cylinder generally indicated at 53 and a right cylinder generally indicated at 54. Each of the cylinders 53 and 54 are constructed similar to relatively small single-acting hydraulic rams having their respective housings mounted rigidly on the casing 16. The cylinders 53 and 54 are positioned in diametrically opposed relation with respect to the vertical axis of the pinion gear as shown in Figure 5.

The left cylinder 53 of the servo-pump is provided with a reciprocal piston 55 connected to an externally protruding actuating pin 56. On the upper portion of the pinion gear 25 (Figure 5) there is disposed a cam 57 constrained for rotation with the pinion gear 25. The cam surface 58 of the cam 57 is in alignment with and in abutting relation with the actuating pin 56 so that rotational movement of the cam 57 causes reciprocal movement of the pin 56 and piston 55 of the cylinder 53. The cam 57 may conveniently be circular in shape but positioned in eccentric relation with the pinion gear 25 and king pin 22 as best shown in Figure 5. From this it can readily be seen that rotational movement of the pinion gear 25 and cam 57 causes movement of fluid in the chamber 59 and its connecting port 60. Similar to that described above the right cylinder 54 of the servo-pump is provided with a reciprocable piston 61 connected to an externally protruding pin 62 as shown in Figures 2 and 5. The pin 62 is also in alignment and in abutting relation with the cam surface 58 (Figure 5) of the cam 57. Again it may be seen that rotational movement of the pinion gear 25 and cam 57 causes movement of fluid in the chamber 63 and its connecting port 64.

From the foregoing description it can be appreciated that when the pinion gear 25 and cam 57 associated with the trailer 13 is rotated with respect to the tractor 10 and associated casing 16, fluid is exhausted through one of the ports 60 and 64 and fluid is entering through the other of the two ports 60 and 64.

As an alternate form of construction it is apparent that the cam 57 could be eliminated by simply actuating the movement of the pins 56 and 62 by means of tapering grooves or surfaces 65 and 66, respectively as cam surfaces positioned on the outer edges of the rack members 47 and 34, respectively as illustrated in Figure 2. Thus movement of the rack members 47 and 34 correspondingly actuates the pistons 55 and 61 at the servo-pump.

An alternate type the servo-pump may conveniently be in the form of a gear pump of conventional design illustrated schematically at 139 in Figure 6. The servo-pump 139 may conveniently be mounted on the casing 16 of the tractor 10 and having its drive means in the form of a gear in meshed relation with the pinion 25 in a conventional manner.

The general construction of the hitch connection between the trailer 13 and tractor 10 and the power unit of the steering mechanism has been described. It should be apparent that in order to steer the tractor 10 and its associated trailer 13, it is necessary to force controllably an angular displacement between the longitudinal axis of the tractor 10 with respect to the longitudinal axis of the trailer 13. Such angular displacement can be accomplished by energizing controllably one of the rams 30 or 31 appropriate to the direction desired.

One of the components employed to control the energizing of the rams 30 and 31 appropriately is a control valve generally indicated at 67 illustrated in Figures 4 and 5. The control valve 67 may be comprised of a housing 68 including an end wall 69 on one end thereof and a closure member 70 on the other end thereof. The housing 68 is provided with a longitudinally disposed bore 71. The housing 68 is provided with a first annular groove 72, a second annular groove 73, a third annular groove 74, a fourth annular groove 75 and a fifth annular groove 76 in parallel arrangement concentric with the bore 71 as best illustrated in Figure 4. The annular grooves 72 through 76 form lands 77, 78, 79 and 80 in the bore 71.

Positioned in slidable relation in the bore 71 is a movable valve member or plunger generally indicated at 81. The valve member 81 is provided with a first circumferential groove 82, a second circumferential groove 83 and a third circumferential groove 84 in parallel relation. The circumferential grooves 82 through 84 form lands 85 and 86 as shown in Figures 4 and 5. The annular groove 72 is communicatively connected to a discharge port 87. Also, the annular groove 76 is communicatively connected to the discharge port 87 through the conduits 88 and 89 leading to the annular groove 72 which in turn is in communication with the discharge port 87 as previously stated. The annular groove 73 is provided with a first fluid outlet port 90 connected to the conduit 91 which conduit 91 is communicatively connected with the port 37 (Figure 5) of the first ram 30. The annular groove 75 is provided with a second fluid outlet port 92 connected to the conduit 93 which conduit 93 is communicatively connected with the port 45 of the second ram 31.

In the control valve 67 there is disposed a check valve generally indicated at 94 having its inlet side 95 in communication with the discharge port 87 and its outlet side 96 in communication with the conduit 97. The conduit 97 is communicatively connected to the internal portion of the casing 16 which may conveniently serve as a sump or reservoir 99 of the fluid return means. The check valve 94 is urged into closed position by a captive spring 98 selected so that fluid in the discharge port 87 is maintained at a predetermined low value, for example, 25 pounds per square inch. Thus when the fluid pressure in the discharge port 87 exceeds the predetermined low value, the check valve 94 opens to allow excess fluid to escape through the conduit 97 back to the sump or reservoir 99.

Positioned on the upper portion of the control valve 67 is a fluid inlet port 100 communicatively connected to a source of fluid pressure such as the tractor's general utility all-purpose high capacity hydraulic pump generally indicated at 101 through the conduit 102 shown schematically in Figure 5. The fluid source for the pump 101 is taken from the sump or reservoir 99 through the conduit 103 in a conventional manner.

The general construction of the control valve 67 has now been described except the operational means for actuating movement of the movable valve member or plunger 81. It will be seen from Figure 4 that the rightward end portion of the control valve 67 is a centering device indicated generally at 104, for urging the movable valve member 81 toward central (neutral) position. The centering device 104 essentially consists of a captive spring 105 disposed between two annular collars 106 and 107. The collar 106 is in slidable relation with respect to the right end portion 108 of the valve plunger 81. The collar 106 is also slidable within the bore 109 of the closure member 70 as may be seen in Figure 4. However, the land 110 of the valve plunger 81 is engageable with the collar 106 for rightward movement in the bore 109. Leftward movement of the collar 106 is limited by the shoulder 111 in the housing 68. The collar 107 is disposed at the other end of the spring 105 in slidable relation with reference to the portion 108 of the valve plunger 81. Rightward movement of the collar 107 is limited by the shoulder 112 in the closure member 70. A leftward movement of the valve plunger 81 also moved the collar 107 leftwardly by the engagement of the head or snap ring 113 connected rigidly to the portion 108 of the plunger 81.

As illustrated in Figure 4, the valve plunger 81 is in a neutral position. If the plunger 81 is moved leftwardly the collar 106 remains engaged with the shoulder 111 while the collar 107 is moved leftwardly in the bore 109 with the plunger 81 by engagement with the snap ring 113 thereby further compressing the spring 105. Conversely, if the plunger 81 is moved rightwardly, the land 110 thereof engages the collar 106 for slidable movement in the bore 109 while the collar 107 is in abutting relation with the shoulder 112 thereby further compressing the spring 105. Thus it may be seen that the centering device 104 urges the plunger 81 toward the neutral position as illustrated in Figure 4.

In order to actuate movement of the valve plunger 81 from a neutral position to an operating position, the control valve 67 is provided with a servo-motor. This servo-motor may conveniently be comprised of a one-way acting left cylinder, generally indicated at 114, and a one-way acting right cylinder generally indicated at 115. The piston 116 of the cylinder 114 may be an integral part of the plunger 81 or may be a separate element slidable in the bore 117 in the end wall 69 in abutting relation with the plunger 81 as best illustrated in Figure 4. Similarly the piston 118 of the cylinder 115 may be an integral part of the plunger 81 or may be a separate slidable element in the bore 119 in the closure member 70 in abutting relation with the plunger 81. Thus it may be apparent that if the small chamber 120 is pressurized by fluid under pressure entering through at least one of the conduits 121, 122 and 123, the piston 116 urges movement of the valve plunger 81 in a rightward direction from neutral position to an operating position. It should be apparent that in order for the valve plunger 81 to move rightwardly, the chamber 120 must necessarily be energized with sufficient fluid pressure so that the piston 116 overcomes the force exerted by the centering device 104. Likewise, it may also be seen that if the small chamber 124 is pressurized by fluid under pressure entering through at least one of the conduits 125, 126 and 127 the piston 118 urges movement of the valve plunger 81 in a leftward direction from neutral position to an operating position. Again it should be apparent that in order for the valve plunger 81 to move leftwardly, the chamber 124 must necessarily be energized with sufficient fluid pressure so that the piston 118 overcomes the force exerted by the centering device 104.

In order to prevent the occurrence of fluid pressure in the left end opening 128 of the bore 71 from inhibiting movement of the plunger 81, a breather passage 129 is provided in the housing 68 communicatively connecting the opening 128 with the first annular grove 72 which groove is communicatively connected with the discharge port 87. Likewise, the spring chamber or bore 109 is provided with a breather passage 130 communicatively connecting the bore 109 with the fifth annular groove 76 which conduit is communicatively connected with the discharge port 87 through the conduits 88 and 89. Thus, there is no fluid pressure differential between the opening 128 and the bore 109.

Figure 5 illustrates, in schematic form, the hydraulic system of this invention. It will readily be apparent that there are two basic fluid circuits illustrated, one being the control circuit and the other being the working circuit. For convenience the control circuit will first be described.

The numeral 131 indicates a manually operable steering wheel. The wheel 131 through steering shaft 132 drives rotatably a small positive displacement pump indicated at 133. Rotation of the wheel 131 in one direction causes movement of fluid from the conduit 122 to the conduit 126. Conversely, rotation of the wheel 131 in the opposite or other direction causes movement of fluid from the conduit 126 to the conduit 122. A pair of oppositely connected small relief valves may conveniently be provided so that a by-pass condition occurs in the event that fluid pressure between the conduits 122 and 126 exceeds a predetermined value.

The conduits 122 and 126 are communicatively connected to the servo-motor comprising the left cylinder 114 and the right cylinder 115 respectively. The conduits 123 and 127 communicatively connected to the cylinders 114 and 115, respectively, terminate at the outlet sides of a pair of small check valves, respectively, as illustrated in Figure 5. The inlet sides of the check valves 136 and 137 are connected to the discharge port 87 through the conduit 89 and first annular groove 72. Normally there is no movement of fluid through the conduits 123 and 127 and the check valves 136 and 137. The sole purpose of the check valves 136 and 137 is to permit replenishment of fluid in the control circuit from the working circuit in the event that fluid in the control circuit is lost by leakage or otherwise.

The conduit 121 communicatively connects the small chamber 120 of the left cylinder 114 with the port 64 and chamber 63 of the right cylinder 54 of the servo-pump. Similarly the conduit 125 communicatively connects the small chamber 124 of the right cylinder 115 with the port 60 and chamber 59 of the left cylinder 53 of the servo-pump.

From the foregoing it can be seen that the control circuit of this invention includes the displacement pump 133, the left cylinder 114 and the right cylinder 115 comprising the servo-motor, the left cylinder servo-pump 53 and the right cylinder servo-pump 54 (or gear pump 139 of Figure 6), small relief valves 134 and 135 interconnected communicatively through conduits 122, 126, 123, 127, 121 and 125 as shown in Figure 5. The operating characteristics of the control circuit for controllably shifting the movable valve member 81 of the control valve 67 will be described later.

The working circuit of this invention will now be described.

The casing 16 of the reversible motor 29 (Figure 2) may for convenience be entirely closed so that it can serve as a reservoir 99 for the source of fluid under pressure 101. The reservoir 99 may be suitably vented as schematically indicated at 138 in Figure 5. The reservoir 99 is communicatively connected to the inlet side of the pump 101 by the conduit 103. The outlet side of the pump 101 is communicatively connected to the inlet port 100 of the control valve 67 through the conduit 102. The conduit 91 communicatively connects the first fluid outlet port 90 and the second annular groove 73 of the control valve 67 with the chamber 36 of the ram 30. Similarly, the conduit 93 communicatively connects the fourth annular groove 75 through the second fluid outlet port 92 of the control valve 67 with the chamber 44 of the second ram 31. The conduits 88 and 89 communicatively connects the fifth annular groove 76 with the first annular groove 72 of the control valve 67. The outlet side 96 of the check valve 94 is communicatively connected to the reservoir 99 through the conduit 97.

Having described the construction of this invention, the operation of the system will now be described.

*Operation*

The steering system of this invention as shown in the drawings is in a condition for a straight course of travel of the tractor 10 and its associated trailer 13. Thus the control valve 67 is in neutral position as illustrated in Figures 4 and 5 and the pistons 32 and 40 of the rams 30 and 31, respectively, are in medial position as shown in Figures 2 and 5.

Referring to Figure 5, the control circuit which basically comprises the steering pump 133, small relief valves 134 and 135, left cylinder 114 and right cylinder 115 (servo-motor), left cylinder servo-pump 53 and right cylinder servo-pump 54 (or gear pump 139 of Figure 6), interconnected together by conduits 121, 122, 123, 125, 126 and 127, is in a static condition whereby the movable valve member 81 of the control valve 67 is in neutral position. It is to be noted that the control circuit is a closed circuit independent of the pump 101. It will also be noted that the cam 57 (Figure 5) or the grooves 65 and 66 (Figure 2) maintains pistons 55 and 61 in medial position indicating that the course of travel of the tractor 10 and trailer 13 is in a straight line.

The flow of fluid through the working circuit will now be described.

With continued reference to Figure 5, fluid under pressure from the pump 101 flows to the inlet port 100 of the control valve 67 through the conduit 102. From the inlet port 100 the fluid passes into the third annular groove 74. Since the movable valve member 81 is in neutral position, neither of the lands 85 and 86 register with lands 77, 78, 79 and 80 so fluid entering the third annular groove 74 may freely communicate with the first annular groove 72, second annular groove 73, fourth annular groove 75 and fifth annular groove 76. However, the only outlet for the fluid is by way of the first annular groove 72 in communication with the discharge port 87. The discharge port 87 may also be considered the inlet side of check valve 94. The valve 94 is adjusted to open at a low value predetermined fluid pressure, for example, 25 pounds per square inch, so that the fluid bypasses therethrough to the sump 99 through the conduit 97. Thus when the control valve 67 is in neutral position as shown in Figures 4 and 5, the fluid pressure within the bore 71 is maintained at a value not exceeding the value set by the check valve 94. From this it can be seen that both the first ram 30 and second ram 31 are energized at low pressure from fluid in the second annular groove 73 communicatively connected to the ram 30 through the conduit 91 and the fourth annular groove 75 communicatively connected to the ram 31 through the conduit 93. Since both rams 30 and 31 are energized equally the pistons 32 and 40 being opposed to each other will not move. The force exerted by the pistons 32 and 40 maintain the teeth 35 of the rack member 34 and teeth 43 of the rack member 42 in constant force of low magnitude with the teeth of the pinion gear 25 thus eliminating backlash without appreciable wear on the teeth. This antibacklash feature provides noiseless operation and eliminates damage to the teeth through pounding during the operation thereof. It will also be noted that this anti-backlash feature is present during all operational movements of the steering mechanism as will be evident in the further discussion. It should now be clear that when the control valve 67 is in neutral position, fluid from the pump 101 is effectively bypassed back to the reservoir 99.

Now suppose the operator rotates the steering wheel 131 in one direction. The displacement or steering pump 133 causes a pressure rise in the conduit 122 of the control circuit above that in the conduit 126. Since the fluid in the conduits 121, 123, 125 and 127 is static, there is a pressure differential created whereby the pressure in the small chamber 120 of the left cylinder 114 is greater than the pressure in the small chamber 124 of the right cylinder 115. When the aforementioned pressure differential is great enough to overcome the action of the centering device 104, the piston 116 moves the plunger 81 of the control valve 67 rightwardly to a forward operating position. When the forward operating position of the plunger 81 is reached the land 85 has moved sufficiently to register with land 78 thereby terminating fluid flow from the third annular groove 74 to the second annular groove 73 and the first annular groove 72. Simultaneously, the land 86 has moved sufficiently to register with land 80 thereby terminating flow of fluid from the third annular groove 74 and fourth annular groove 75 to the fifth annular groove 76.

With the plunger 81 in the forward operating position the fluid from the pump 101 enters the inlet port 100 of the control valve 67 and passes into the third annular groove 74. From the third annular groove 74 the fluid passes into the fourth annular groove 75 and into the chamber 44 through the conduit 93 thus energizing the second ram 31 at high pressure. The ram 31 therefore expands to move the pinion gear 25 clockwise as viewed in Figure 5. Meanwhile the first ram 30 is caused to retract by movement of the pinion 25, rack member 34 and piston 32. The fluid in the chamber 36 of the ram 30 exhausts into the second annular groove 73 through the conduit 91. From the second annular groove 73 the fluid passes into the first annular groove 72 which groove is in communication with the discharge port 87. From the discharge port 87 the fluid passes through the check valve 94 in the manner described previously to the reservoir 99 through the conduit 97. Thus the tractor 10 is steered in a rightward direction.

Assuming again that the tractor 10 and trailer 13 are aligned for a straight course of travel and the operator wishes to effect steering in the other direction (leftward), he rotates the steering wheel 131 in the other direction. The displacement or steering pump 133 operates reversely from that previously described and causes a pressure rise in the conduit 126 of the control circuit above that in the conduit 122. Since, as before, the fluid in the conduits 121, 123, 125 and 127 is static, there is a pressure differential created whereby the pressure in the small chamber 124 of the right cylinder 115 is greater than the pressure in the small chamber 120 of the left cylinder 114. Again, as before, when the pressure differential is great enough to overcome the action of the centering device 104, the piston 118 moves the plunger 81 of the control valve 67 leftwardly from a neutral position to a reverse operating position. When the reverse operating position is reached, the land 85 has moved sufficiently to register with land 77 thereby terminating flow of fluid from the second annular groove 73 and the third annular groove into the first annular groove 72. Simultaneously, the land 86 has moved sufficiently to register with the land 79 thereby terminating flow of fluid from the third annular groove 74 into the fourth annular groove 75 and the fifth annular groove 76.

With the plunger 81 in the reverse operating position the fluid from the pump 101 enters the inlet port 100 of the control valve 67 and passes into the third annular groove 74. From the third annular groove 74 the fluid passes into the second annular groove 73 and into the chamber 36 through the conduit 91 thus energizing the first ram 30 at high pressure. The ram so therefore expands to move the pinion gear 25 relatively counterclockwise as viewed in Figure 5. Meanwhile, the second ram 31 is caused to retract by movement of the pinion gear 25, rack member 42 and piston 40. The fluid in the chamber 44 of the ram 31 exhausts into the fourth annular groove 75 through the conduit 93. From the fourth annular groove 75 the fluid passes into the fifth annular groove 76 which groove is in communication with the discharge port 87 through conduits 88 and 89, and the first annular groove 72. From the discharge port 87 the fluid passes through the check valve 94 in the manner described previously to the sump 99 through the conduit 97.

Up to this point, means have been described whereby the operator, by manually manipulating the steering wheel 131 appropriately, may shift the plunger 81 of the control valve 67 into any one of three positions, namely, neutral position, a forward operating position for urging steering in one direction, and a reverse operating position for urging steering in the other direction. In order that the operator may have the benefit of "road feel" in the steering operation, a means for follow-up or progressive steering in this invention will now be described.

The follow-up means employed in the control circuit is essentially of the telemeter type system whereby means are provided for progressively equalizing the fluid pressure in the left cylinder 114 with that of the right cylinder 115 of the servo-motor so that as the tractor 10 reaches a predetermined angular displacement with respect to the trailer 13, the plunger 81 of the control valve 67 is progressively moved toward neutral position independently of the steering wheel 131 and associated positive displacement pump 133.

For example, suppose the operator desires to alter the course of travel from a straight line to an arcuate path in one direction in an ordinary steering movement. In order to accomplish an arcuate path of travel it is necessary that the tractor 10 be angularly displaced with respect to the trailer 13. The operator rotates the steering wheel 131 in one direction to a predetermined position and manually maintains the wheel 131 fixedly in the assumed position. As previously described, this steering movement creates a pressure differential in the control circuit whereby the left cylinder 114 of the servo-motor actuates the plunger 81 in a rightward direction from neutral position to a forward operating position. Immediately the ram 31 is energized and commences to expand while the ram 30 concurrently commences to retract further from the position illustrated in Figure 5. Simultaneously the pinion gear 25 begins to rotate clockwise (Figure 5) which movement imparts an angular displacement between the tractor 10 and trailer 13. At the same time the cam surface 58 of the cam 57 begins to rotate clockwise respective to the servo-pump 53, 54. The servo-pump 53 is caused to further retract by the action of the cam surface 58 on the actuating pin 56. Thus the piston 55 forces fluid in the chamber 59 into the conduit 125 thereby gradually elevating the fluid pressure in the small chamber 124 of the control valve 67. Simultaneously, the servo-pump 54 is permitted to expand from the position shown in Figure 5 by the action of the actuating pin 62 on the cam surface 58 of the rotating cam 57. Thus the chamber 63 increases in volume admitting additional fluid therein from the small chamber 120 of the cylinder 114 communicatively connected through the conduit 121. The decrease in fluid pressure in the small chamber 120 with a corresponding increase in fluid pressure in the small chamber 124 is thus progressive in character for as the pinion gear 25 rotates the fluid pressure in the two chambers 120 and 124 approach equal value. As the pressure differential in the two chambers 120 and 124 decrease the valve plunger 81 of the control valve 67 progressively moves toward neutral position assisted by the centering device 104. When the plunger 81 reaches neutral, by-pass of fluid from the pump 101 is again re-established and the ram 31 is no longer energized which halts any further rotation of the pinion 25. Thus the tractor 10 has assumed an angular displacement with respect to the trailer 13 and will remain at such angular displacement until the operator again rotates the steering wheel 131. Obviously, steering in the opposite direction will produce corresponding results in the opposite direction.

It should be understood that the volumetric displacement of the servo-pump 53 and 54 and the servo-motor 114 and 115 must be selected appropriately with that of the displacement pump 133 so that for each degree the steering wheel is rotated will produce a corresponding angular displacement of the tractor 10 with respect to its trailer 13. Likewise with reference to the alternate form of servo-pump 139 shown in Figure 6, the volumetric displacement characteristics thereof must be selected appropriately according to the characteristics of the positive displacement pump 133 and servo-motor 114 and 115, as may be obviously understood by one skilled in the art of hydraulics.

It should be noted that particularly when the tractor 10 and its associated trailer 13 are travelling over rough or uneven terrain, any force imparted to one with reference to the other which force tends to alter the angular displacement between the two is at once transmitted to the servo-pumps 53 and 54 (or gear pump 139) which will move the plunger 81 of the control valve 67 from the neutral position to an operating position to counteract such force in the direction necessary to correct the alteration in angular displacement. Such force also affects fluid pressure in the conduits 122 and 126 which acting through the displacement pump 133 reflects back to the operator at the steering wheel 131. Thus, the operator has the benefit of road feel similar as that in steering an automobile.

Having thus described an embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A fluid power steering system comprising an hydraulic working circuit and an hydraulic control circuit, a source of fluid pressure including fluid return means communicatively connectable to said working circuit, a check valve disposed in said fluid return means, a control valve having an inlet port communicatively connected to said source of fluid pressure, a first single-acting hydraulic ram operably connected for actuating steering in one direction, a first fluid outlet port in said control valve communicatively connected to said first ram, a second single-acting hydraulic ram operably connected for actuating steering in the other direction, a second fluid outlet port in said control valve communicatively connected to said second ram, a movable valve member disposed in said control valve, said member being movable from a neutral position to a forward operating position for communicatively connecting said source of fluid pressure with said first ram for actuating steering in one direction, said valve member being movable from said neutral position to a reverse operating position for communicatively connecting said source of fluid pressure with said second ram for actuating steering in the other direction, said control valve being adapted to connect communicatively at least one of said rams with said fluid return means when said control valve is in any one of said operating positions, said control valve being adapted to connect communicatively both of said rams with said fluid return means and said source of fluid pressure when said control valve is in said neutral position, and a servo-motor positioned to actuate said movable valve member responsive to fluid pressure in said hydraulic control circuit.

2. A fluid power steering system comprising an hydraulic working circuit and an hydraulic control circuit, a source of fluid pressure including fluid return means communicatively connectable to said working circuit, a control valve having an inlet port communicatively connected to said source of fluid pressure, a first single-acting hydraulic ram operably connected for actuating steering in one direction, a first fluid outlet port in said control valve communicatively connected to said first ram, a second single-acting hydraulic ram operably connected for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve being adapted to by-pass fluid from said discharge port to said fluid return means when fluid pressure in said discharge port exceeds a predetermined low value, a movable valve member disposed in said control valve, said member being movable from a neutral position to a forward operating position for communicatively connecting said source of fluid pressure with said first ram for actuating steering in one direction, said valve member being movable from said neutral position to a reverse operating position for communicatively connecting said source of fluid pressure with said second ram for actuating steering in the other direction, said control valve being adapted to connect communicatively at least one of said rams with said fluid discharge port when said control valve is in any one of said operating positions, said control valve being adapted to connect communicatively both of said rams with said discharge port and said source of fluid pressure when said control valve is in said neutral position, and a servo-motor positioned to actuate said movable valve member responsive to fluid pressure in said hydraulic control circuit.

3. A fluid power steering system comprising an hydraulic working circuit and an hydraulic control circuit, a source of fluid pressure including fluid return means communicatively connectable to said working circuit, a check valve disposed in said fluid return means, a control valve having an inlet port communicatively connected to said source of fluid pressure, a first single-acting hydraulic ram operably connected for actuating steering in one direction, a first fluid outlet port in said control valve communicatively connected to said first ram, a second single-acting hydraulic ram operably connected for actuating steering in the other direction, a second fluid outlet port in said control valve communicatively connected to said second ram, a movable valve member disposed in said control valve, said member being movable from a neutral position to a forward operating position for communicatively connecting said source of fluid pressure with said first ram for actuating steering in one direction, said valve member being movable from said neutral position to a reverse operating position for communicatively connecting said source of fluid pressure with said second ram for actuating steering in the other direction, said control valve being adapted to connect communicatively at least one of said rams and with said fluid return means when said control valve is in any one of said operating positions, said control valve being adapted to connect communicatively both of said rams with said fluid return means and said source of fluid pressure when said control valve is in said neutral position, a servo-motor positioned to actuate said movable member of said control valve, said control circuit having a manually operable means for moving fluid in at least one direction in said control circuit, said servo-motor being operatively responsive to movement of fluid in said control circuit for actuating said movable member of said control valve, and means for reversing the direction of said movement of fluid in said control circuit for returning said movable member from an operating position to neutral position when one of said rams has been actuated to a predetermined adjustable limit.

4. A fluid power steering system comprising an hydraulic working circuit and an hydraulic control circuit, a source of fluid pressure including fluid return means communicatively connectable to said working circuit, a control valve having an inlet port communicatively connected to said source of fluid pressure, a first single-acting hydraulic ram operably connected for actuating steering in one direction, a first fluid outlet port in said control valve communicatively connected to said first ram, a second single-acting hydraulic ram operably connected for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve being adapted to by-pass fluid from said discharge port to said fluid return means when fluid pressure in said discharge port exceeds a predetermined low value, a movable valve member disposed in said control valve, said member being movable from a neutral position to a forward operating position for communicatively connecting said source of fluid pressure with said first ram for actuating steering in one direction, said valve member being movable from said neutral position to a reverse operating position for communicatively connecting said source of fluid pressure with said second ram for actuating steering in the other direction, said control valve being adapted to connect communicatively at least one of said rams with said fluid discharge port when said control valve is in any one of said operating positions, said control valve being adapted to connect communicatively both of said rams with said discharge port and said source of fluid pressure when said control valve is in said neutral position, a servo-motor positioned to actuate said movable member of said control valve, said control circuit having manually operable means for moving fluid in at least one direction in said control circuit, said servo-motor being operatively responsive to movement of fluid in said control circuit for actuating said movable member of said control valve, and means for reversing said movement of fluid in said control circuit for returning said movable member from an operating position to neutral position when one of said rams has been actuated to a predetermined adjustable limit.

5. In a steering mechanism an hydraulic system comprising an hydraulic working circuit and an hydraulic control circuit, a source of fluid pressure including fluid return means communicatively connectable to said working circuit, a control valve, said control valve having an inlet port communicatively connected to said source of fluid pressure, a first single-acting hydraulic ram operably connected to said mechanism for actuating steering in one direction, a second single-acting hydraulic ram operably connected to said mechanism for actuating steering in the other direction, said control valve having a first outlet port communicatively connected to said first ram, said control valve having a second outlet port communicatively connected to said second ram, a discharge port disposed in said control valve, a check valve having its inlet side communicatively connected to said discharge port and its outlet side communicatively connected to said fluid return means, a valve plunger slidably disposed in said control valve, said valve plunger being adapted to communicatively connect at least one of said outlet ports with said discharge port when said control valve is in an operating position, said valve plunger being adapted to connect communicatively both of said rams with said discharge port and said source of fluid pressure when said plunger is in a neutral position, and said valve plunger being adapted to connect communicatively said source of fluid pressure alternately with one of said rams when said control valve is in an operating position.

6. A fluid power steering system comprising an hydraulic working circuit and an hydraulic control circuit, a source of fluid pressure including fluid return means communicatively connectable to said working circuit, a control valve having an inlet port communicatively connected to said source of fluid pressure, a first single-acting hydraulic ram operably connected for actuating steering in one direction, a first fluid outlet port in said control valve communicatively connected to said first ram, a second single-acting hydraulic ram operably connected for actuating steering in the other direction, a second fluid outlet port in said control valve communicatively connected to said second ram, a discharge port disposed in said control valve, a check valve having its inlet side communicatively connected with said discharge port and its outlet side communicatively connected to said fluid return means, said check valve being adapted to by-pass fluid from said discharge port to said fluid return means when fluid pressure in said discharge port exceeds a predetermined low value, a movable valve member disposed in said control valve, said member being movable from a neutral position to a forward operating position for communicatively connecting said source of fluid pressure with said first ram for actuating steering in one direction, said valve member being movable from said neutral position to a reverse operating position for communicatively connecting said source of fluid pressure with said second ram for actuating steering in the other direction, said control valve being adapted to connect communicatively said rams and source of fluid pressure with said discharge port when said control valve is in neutral position, a servo-motor positioned to actuate said movable member of said control valve, said control circuit having manually operable means for moving fluid in at least one direction in said control circuit, said servo-motor being operatively responsive to movement of fluid in said control circuit for actuating said movable member of said control valve, a servo-pump disposed in said steering system communicatively connected to said control circuit, said servo-pump being operatively responsive to steering movement whereby fluid in said control circuit is moved in a direction to actuate said servo-motor for returning said movable member of said control valve from an operating position to neutral position.

7. A fluid power steering system according to claim 6 wherein the servo-pump is in the form of a gear pump drivingly connected to said system and operatively responsive to steering movement.

References Cited in the file of this patent

UNITED STATES PATENTS

| | | |
|---|---|---|
| 752,491 | Warren | Feb. 16, 1904 |
| 2,368,135 | Hamill | Jan. 30, 1945 |
| 2,766,585 | Wittren | Oct. 16, 1956 |
| 2,782,603 | Beecroft | Feb. 26, 1957 |
| 2,833,253 | Wittren | May 6, 1958 |
| 2,836,960 | Wittren | June 3, 1958 |
| 2,874,542 | Tear | Feb. 24, 1959 |